(12) United States Patent
Li et al.

(10) Patent No.: US 12,719,089 B2
(45) Date of Patent: Aug. 25, 2026

(54) ELECTROLYTE FOR ULTRA LOW ELECTROLYTE-TO-ACTIVE MATERIAL RATIO IN LITHIUM SULFUR/SELENIUM BATTERY

(71) Applicant: UCHICAGO ARGONNE, LLC, Chicago, IL (US)

(72) Inventors: Matthew Li, Willowbrook, IL (US); Yingying Xie, Willowbrook, IL (US); Khalil Amine, Oakbrook, IL (US); Chi Cheung Su, Westmont, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 613 days.

(21) Appl. No.: 18/137,600

(22) Filed: Apr. 21, 2023

(65) Prior Publication Data

US 2024/0356080 A1 Oct. 24, 2024

(51) Int. Cl.
*H01M 10/0568* (2010.01)
*H01M 10/0567* (2010.01)

(52) U.S. Cl.
CPC .................. *H01M 10/0568* (2013.01); *H01M 2300/0037* (2013.01)

(58) Field of Classification Search
CPC .. H01M 10/0568; H01M 4/425; H01M 10/04; H01M 4/32
See application file for complete search history.

(56) References Cited

U.S. PATENT DOCUMENTS

2007/0224516 A1* 9/2007 Deguchi ............. H01M 50/443 429/339
2010/0239914 A1* 9/2010 Mikhaylik .......... H01M 4/5815 429/231.8
2014/0142242 A1* 5/2014 Gerbec .................. C08G 77/04 524/588
2015/0132666 A1* 5/2015 Ogata ................... H01M 4/485 429/231.1
2016/0118638 A1* 4/2016 Gronwald ............... H01M 4/62 429/126
2017/0025715 A1* 1/2017 Saka ...................... C01G 53/50
2018/0205111 A1* 7/2018 Yushin .............. H01M 10/0569
2022/0123312 A1* 4/2022 Li ....................... H01M 4/5815

OTHER PUBLICATIONS

Chu, F., et al., "Low Concentrate Electrolyte Enabling Cryogenic Lithium-Sulfur Batteries," Advanced Functional Materials, pp. 1-15 (2022).

(Continued)

*Primary Examiner* — Kenneth J Douyette
(74) *Attorney, Agent, or Firm* — Foley & Lardner LLP

(57) ABSTRACT

An electrochemical device comprising of a sulfur-based or alkali and/or alkali earth metal sulfide-based cathode, alkali and/or alkali earth metal-based anode with or without anode protection, a porous separator, non-aqueous electrolyte composition comprising of two or more alkali and/or alkali earth salts that has a total non-alkali/alkali earth metal $NO_3^-$ (nitrate) salt concentration of below 0.1 M, one or more solvent, and the inclusion of a high donor number lithium salt; wherein the electrochemical device is a alkali and/or alkali earth metal sulfur battery.

21 Claims, 14 Drawing Sheets

(56) References Cited

OTHER PUBLICATIONS

Gupta, A., et al., "Influence of Lithium Polysulfide Clustering on the Kinetics of Electrochemical Conversion in Lithium-Sulfur Batteries", Chemistry of Materials, 32, pp. 2070-2077 (2020).

Hagen, M., et al., "Lithium-Sulfur Cells: The Gap between the State-of-the-Art and the Requirements for High Energy Battery Cells," Advanced Energy Materials, 5, pp. 1-11, (2015).

Hyunwon, C., et al., "Unraveling the Dual Functionality of High-Donor-Number Anion in Lean-Electrolyte Lithium-Sulfur Batteries," Advanced Energy Materials, 10, pp. 1-11 (2020).

Li, M., et al., "A Lithium-Sulfur Battery Using a 2D Current Collector Architecture with a Large-Sized Sulfur Host Operated under High Areal Loading and Low E/S Ratio," Advanced Materials, 30, pp. 1-9 (2018).

Zhao, M., et al., "Lithium-Sulfur Batteries under Lean Electrolyte Conditions: Challenges and Opportunities," Angew. Chem. Int. Ed. 2020, 59, 12636-12652.

Linert, W., et al., "Donor Nos. of Anions in Solution: the Use of Solvatochromic Lewis Acid-Base Indicators," J. Chem. Soc. Dalton Trans. 1993, pp. 3181-3186.

* cited by examiner

ELECTROLYTE FOR ULTRA LOW ELECTROLYTE-TO-ACTIVE MATERIAL RATIO IN LITHIUM SULFUR/SELENIUM BATTERY

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to energy efficient lithium sulfur batteries using an electrolyte composition to promote discharge at ultra-low electrolyte-to-sulfur ratios.

BACKGROUND

Rechargeable lithium-sulfur and/or -selenium batteries are a promising alternative to lithium-ion batteries due to their high energy density and low raw material cost. Selenium/sulfur-based batteries are prepared by one of two methods. The first method is the preparation of a cathode with elemental sulfur, or a blend of sulfur and selenium, where the cell is fabricated in its charged state. The second is where the cathode is formed with a lithium sulfide and/or selenide, and the cell is fabricated in its discharge state. Midway through a discharge or charge, polysulfide/polyselenide species are formed in the cathodes, independent of how they are made. At the end of the charge lithium sulfide and/or lithium selenide and lithium disulfides are formed.

SUMMARY

In one aspect, an electrochemical device includes a cathode comprising an active cathode material, an anode, a porous separator, and a non-aqueous electrolyte that includes $LiNO_3$, a high donor number anion, a highly dissociative lithium salt other than $LiNO_3$, and an aprotic solvent, where a total lithium salt concentration from the high donor number anion and the highly dissociative lithium salt that is not originating from $LiNO_3$, is below 0.1 M, the electrochemical device is a lithium sulfur, lithium selenium, or lithium sulfur-selenium battery, and a ratio of non-aqueous electrolyte mass to cathode active material mass does not exceed 4. In any of the above embodiments, the high donor number anion may include $Li[CF_3CO_2]$, $Li[CF_3SO_3]$, $LiClO_4$, LiI, LiBr, or a mixture of any two or more thereof. In any of the above embodiments, a concentration of the high donor number anion may be 0.02 M or less. In any of the above embodiments, a concentration of the highly dissociative lithium salt may be 0.06 M or less.

In any of the above embodiments, the highly dissociative lithium salt may include a lithium alkyl fluorophosphate; a lithium alkyl fluoroborate; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; $Li[CF_3CO_2]$; $Li[C_2F_5CO_2]$; $Li[CH_3SO_3]$; $Li[N(SO_2CF_3)_2]$; $Li[N(SO_2F)_2]$; $Li[C(CF_3SO_2)_3]$; $Li[N(SO_2C_2F_5)_2]$; $LiClO_4$; $LiBF_4$; $LiAsF_6$; $LiSbF_6$; $LiAlCl_4$; $LiPF_6$; $LiNO_3$; $Li_2SO_4$; LiOH; $Li[BF_2(C_2O_4)]$; $Li[B(C_2O_4)_2]$; $Li[PF_2(C_2O_4)_2]$; $Li[PF_2(C_2O_4)]$; $LiAsF_6$; $LiSbF_6$; $LiNO_3$; $Li_2(B_{12}X_{12-p}H_p)$; $Li_2(B_{10}X_{10-p}H_p)$; or a mixture of any two or more thereof, wherein X may be independently at each occurrence F, Cl, Br, or I, p may be 0, 1, 2, 3, 4, 5, 6, 7, 8, 9, 10, 11, or 12, and p' may be 0, 1, 2, 3, 4, 5, 6, 7, 8, 9, or 10.

In any of the above embodiments, the aprotic solvent may include dimethoxyethane (DME), 1,3 dioxolane (DOL), diethylene glycol dimethyl ether (DEGDME), triethylene glycol dimethyl ether, tetraethylene glycol dimethyl ether (TEGDME), fluorinated ethers or fluorinated glycol or a mixture of any two or more thereof. In some such embodiments, the aprotic solvent may include a fluorinated ether or fluorinated polyether.

In any of the above embodiments, the cathode may include an alkali earth metal sulfide, an alkali earth metal selenide, an alkali earth metal sulfide/selenide, elemental sulfur, elemental selenium, or a mixture of any two or more thereof. In any of the above embodiments, the anode may include lithium, lithiated carbon, lithiated tin, lithiated silicon, sodium, sodiated carbon, sodiated tin, sodiated silicon, potassium, potassiated carbon, potassiated tin, potassiated silicon, magnesium, magnesiated carbon, magnesiated tin, magnesiated silicon, zinc, zincated carbon, zincated tin, zincated silicon, or a mixture of any two or more thereof.

In any of the above embodiments, the non-aqueous electrolyte may include about 0.01 to about 0.095 M of the high donor number anion, about 0.01 to 0.02 M of the highly dissociative lithium salt, about 0.01 to about 0.03 M $LiNO_3$, and solvent of 1,3-dioxolane mixed with an approximately equal volume of 1,2 dimethoxyethane. In some embodiments, the non-aqueous electrolyte includes about 0.05 M of the high donor number anion, about 0.015 M of the highly dissociative lithium salt, about 0.025 M $LiNO_3$, and solvent of 1,3-dioxolane mixed with an approximately equal volume of 1,2 dimethoxyethane.

In any of the above embodiments, the anode may include alkali and/or alkali earth metal, or the anode may be an anode material reduced by the alkali and/or alkali earth metal prior to cell assembly. In some embodiments, the device is an as-prepared device. As used herein, "an as-prepared device" is one that is assembled and prior to first discharge or charge.

In some embodiments, the device further includes an initial discharge/charge product comprising polysulfide anion compensated by an alkali metal and/or alkaline earth metal cation.

In another aspect, a process of charging any of the batteries or electrochemical devices described herein is provided, the process including applying a first charging current to the electrochemical device in an as-assembled, uncharged state to form polysulfide anions within the electrolyte. In any such embodiments, the polysulfide anions are charge compensated by an alkali metal cations and/or alkaline earth metal cations in the electrolyte. In any such embodiments, it is noted that upon further application of the first charging current, elemental sulfur is formed.

In another aspect, a process of discharging any of the batteries or electrochemical devices described herein is provided, the process including applying a first discharging current to the electrochemical device in an as-assembled, undischarged state to form polysulfide anions within the electrolyte. In any such embodiments, the polysulfide anions are charge compensated by an alkali metal cations and/or alkaline earth metal cations in the electrolyte. In any such embodiments, it is noted that upon further application of the first charging current, alkali and/or alkali earth metal sulfide and/or disulfide are formed.

DETAILED DESCRIPTION

Figure 1:
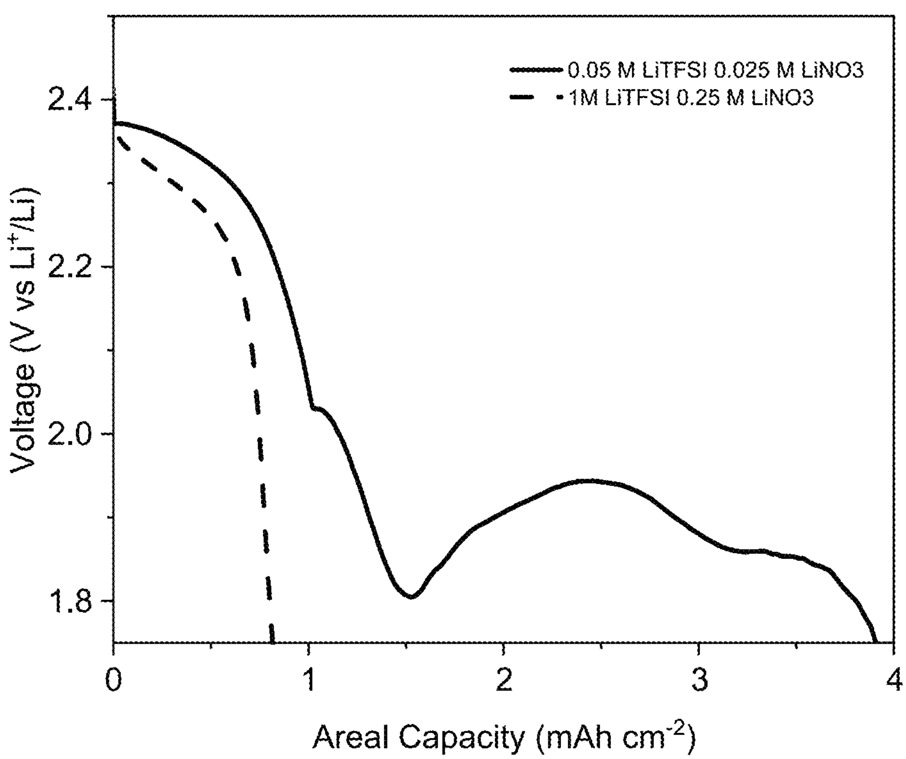
FIG. 1 is a graph of the discharge profile at different cycle numbers of a lithium sulfur battery having an areal sulfur loading of 4 mg $cm^{-2}$ and an electrolyte volume to sulfur mass ratio of 2.5 μL $mg^{-1}{}_{Sulfur}$ at 0.05 C of varying electrolyte compositions: 1) 1 M LiTFSI and 0.25 M $LiNO_3$ in 1,3 dioxolane (DOL)/1,2 dimethoxyethane (DME) (v/v=1/1); and 2) 0.05 M LiTFSI and 0.025 M $LiNO_3$ in DOL/DME (v/v=1/1), according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I);

hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl (i.e. fluoroalkyl) is an alkyl group having one or more halogen (i.e. F, Cl, Br, or I) groups. In some embodiments, haloalkyl refers to a per-haloalkyl group. In some embodiments, a fluoroalkyl group is defined.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted. As used herein the term haloaryl (i.e. fluoroaryl) is an aryl group having one or more halogen (i.e. F, Cl, Br, or I) groups. In some embodiments, haloaryl refers to a per-haloaryl group. In some embodiments, a fluoroaryl group is defined.

Rechargeable lithium sulfur(S) batteries are a promising alternative to lithium ion (Li-ion) batteries, and they have attracted extensive research interest due to their high energy density. In a typical lithium sulfur cell, sulfur is reduced at the cathode where it reacts with $Li^+$ to initially form $Li_2S_n$ ($2<n\leq 8$) species. The $Li_2S_n$ species are then further reduced to $Li_2S$. Upon charging, the $Li_2S$ is oxidized, removed from the electrode surface, and redeposited.

The electrolyte-to-active material (sulfur and/or selenium) ratio is a cell parameter that dictates the overall cell energy density of the lithium sulfur/selenium battery. Electrolytes are often used in excess with an electrolyte-to-activate material ratio of $>4\ \mu L\ mg_s^{-1}$. Although electrolyte is critical to the transport of ions, its excess use will significantly affect the overall mass of the cell. Achieving low electrolyte-to-sulfur ratio is technically difficult due to the high impedance observed once the second discharge plateau initiates.

Provided herein are electrolytes for and rechargeable, non-aqueous, lithium electrochemical cells having a sulfur as the main redox center in the cathode. The form of the sulfur can be in its elemental form or in its reduced form as any alkali and/or alkali earth metal sulfide. The reduction in Li-ion salt concentration and the addition of a high donor number salt, allows for a remarkable increase in discharge voltage, and the discharge profile becomes much more predictable and well-defined.

In a typical electrolyte composition that includes 1M $Li[N(SO_2CF_3)_2]$ and 0.25 M $LiNO_3$, the cell cannot discharge at a low E/S ratio due to the large overpotential. Here we have now found that a reduction of lithium ions, to a total non-$LiNO_3$ concentration of less than 0.1 M, in addition to the use of high donor number salts can be an effective method of reducing the discharge overpotential, leading to a significantly enhanced discharge voltage profile. As used herein the phrase "total non-$LiNO_3$ concentration" as it applies to lithium ions, refers to the concentration of lithium ions in the electrolyte, excluding the contribution of lithium ions from $LiNO_3$.

In one aspect, an electrolyte is provided for use in a lithium-sulfur/selenium battery. As used herein, the term "lithium-sulfur/selenium" battery means a battery in which the cathode contains sulfur, selenium, or a mixture of sulfur and selenium. The electrolytes may include an aprotic solvent, a high donor number anion, and a highly dissociative salt, where a total lithium salt concentration from the high donor number anion and the highly dissociative salt that is not originating from $LiNO_3$, is below 0.1 M. As used herein, a "high donor number anion," is a material that exhibits an apparent donor number greater than about 13 kcal/mol as measured by method described in Linert et al. *J. Chem. Soc. Dalton. Trans.* (1993) 3181-3186. In some embodiments, the apparent donor number of the high donor number anion is from about 13 kcal/mol to about 40 kcal/mol. As used herein, a "highly dissociative salt," is a salt that possesses an apparent donor number less than or equal to about 10 kcal/mol as measured by the same method as high donor number anion. In some embodiments, the apparent donor number of the highly dissociative salt is from about 0 kcal/mol to about 10 kcal/mol. In some preferred embodiments, the highly dissociative salt may be a lithium, sodium, magnesium, calcium, or ammonium salt, or other salt as may be appropriate to the particular anode, cathode, or other cell chemistry that is being employed. However, in other preferred embodiments, the highly dissociative salt is a highly dissociative lithium salt.

Illustrative high donor number anion materials include $Li[CF_3CO_2]$, $Li[CF_3SO_3]$, $LiClO_4$, LiI, LiBr, LiCN, $Li[MeCO_2]$, Li[SCN], LiBr, Li[NCO], or a mixture of any two or more thereof. In some embodiments, the high donor number anion is $Li[CF_3CO_2]$ or $Li[CF_3SO_3]$. The high donor number anion may be present in the electrolyte at low concentrations. For example, the high donor number anion may be present in the electrolyte at 0.02 M or less. This may include less than 0.02 M, from greater than 0 to about 0.02 M, from 0.001 to about 0.02 M, from 0.005 to about 0.02 M, from about 0.01 to about 0.02 M, or from about greater than 0 to about 0.01 M.

Illustrative highly dissociative lithium salts include lithium salt comprises a lithium alkyl fluorophosphate; a lithium alkyl fluoroborate; lithium 4,5-dicyano-2-(trifluoromethyl)imidazole; lithium 4,5-dicyano-2-methylimidazole; trilithium 2,2',2"-tris(trifluoromethyl)benzotris(imidazolate); $LiN(CN)_2$; $Li[C_2F_5CO_2]$; $Li[CH_3SO_3]$; $Li[N(SO_2CF_3)_2]$; $Li[N(SO_2F)_2]$; $Li[C(CF_3SO_2)_3]$; $Li[N(SO_2C_2F_5)_2]$; $LiBF_4$; $LiAsF_6$; $LiSbF_6$; $LiAlCl_4$; $LiPF_6$; $Li_2SO_4$; LiOH; $Li[BF_2(C_2O_4)]$; $Li[B(C_2O_4)_2]$; $Li[PF_2(C_2O_4)_2]$; $Li[PF_4(C_2O_4)]$; $Li_2(B_{12}X_{12-p}H_p)$; $Li_2(B_{10}X_{10-p}H_p)$; or a mixture of any two or more thereof, wherein X is independently at each occurrence F, Cl, Br, or I, p is 0, 1, 2, 3, 4, 5, 6, 7, 8, 9, 10, 11, or 12, and p' is 0, 1, 2, 3, 4, 5, 6, 7, 8, 9, or 10. The term "highly dissociative lithium salt" does not include $LiNO_3$. The highly dissociative lithium salt may be present in the electrolyte at 0.06 M or less. This may include less than 0.06 M, from greater than 0 to about 0.06 M, from 0.001 to about 0.05 M, from 0.005 to about 0.06 M, from about 0.01 to about 0.06 M, or from about greater than 0 to about 0.05 M.

Illustrative aprotic solvents for use in the electrolytes include dimethoxyethane (DME), 1,3 dioxolane (DOL), diethylene glycol dimethyl ether (DEGDME), triethylene glycol dimethyl ether, tetraethylene glycol dimethyl ether (TEGDME), fluorinated ethers or fluorinated glycol or a mixture of any two or more thereof. In some embodiments, the aprotic solvent may include a fluorinated ether or fluorinated polyether. Fluorinated ethers may be represented as: $R^1OR^2$, where $R^1$ may be fluorinated alkyl, and $R^2$ may be alkyl, aryl, fluorinated alkyl, or fluorinated aryl. In some embodiments, $R^1$ and $R^2$ are individually $—(CH_2)_q(CR^4R^5)_p C(R^3)_3$, where each $R^3$, $R^4$, and $R^5$ may be individually H or F, with the proviso that at least one of $R^3$, $R^4$, and $R^5$ may be F, and where q may be 0, 1, 2, or 3, and p may be 0, 1, 2, 3, 4, 5, or 6.

Fluorinated polyethers may be represented as $R^6(O(CH_2)_m)_x(O(CH_2)_n)_yOR^7$; wherein $R^6$ may be fluorinated alkyl, $R^7$ may be fluorinated alkyl, m and n are individually 0, 1, 2, 3, or 4, and x and y are 0 to 10, with the proviso that x and y are not both 0. In some embodiments, at least one of $R^6$ and $R^7$ may be a difluorinated alkyl or trifluorinated alkyl. In other embodiments, $R^6$ and $R^7$ are individually a group of formula $—(CH_2)_q(CR^8R^9)_pC(R^{10})_3$, where each $R^8$, $R^9$, and $R^{10}$ may be individually H or F, with the proviso that at least one of $R^8$, $R^9$, and $R^{10}$ may be F, and where q may be 0, 1, 2, or 3, and p may be 0, 1, 2, 3, 4, 5, or 6. In some embodiments, $R^{10}$ may be F, q may be 1 or 2, and p may be 0. In other embodiments, $R^8$, $R^9$, and $R^{10}$ may be individually H or F; with the proviso that at least one of $R^8$, $R^9$, and $R^{10}$ may be F; y may be 0; x may be 2, 3, 4, 5, or 6; m may be 1, 2, or 3; q may be 0, 1, 2, or 3; and p may be 0, 1, 2, 3, 4, 5, or 6. In further embodiments, $R^{10}$ may be F, y may be 0, x may be 2, 3, or 4, m may be 1, 2, or 3, q may be 1 or 2, and p may be 0. In yet further embodiments, q may be 1, p may be 0, $R^{10}$ may be F, y may be 0, x may be 2 or 3, and m may be 2.

Illustrative electrolytes includes, 0.05 M $Li[N(SO_2CF_3)_2]$, 0.025 M $LiNO_3$, and 0.015 M $Li[SO_3CF_3]$ in DOL/DME (1:1 by volume). The amount of the $LiNO_3$ may be increased in such embodiments at any value up to about 0.075 M.

In some embodiments, the electrolyte may also contain an electrode stabilizing additive such as but is not limited to $LiB(C_2O_4)_2$, $LiBF_2(C_2O_4)_2$, vinylene carbonate, vinyl ethylene carbonate, propargylmethyl carbonate, 1,3,2-dioxathiolane-2,2-dioxide, ethylene sulfite, a spirocyclic hydrocarbon containing at least one oxygen atom and at least on alkenyl or alkynyl group, pyridazine, vinyl pyridazine, quinolone, pyridine, vinyl pyridine, 2,4-divinyl-tetrahydrooyran, 3,9-diethylidene-2,4,8-trioxaspiro[5,5]undecane, 2-ethylidene-5-vinyl-[1,3]dioxane, anisoles, 2,5-dimethyl-1,4-dimethoxybenzene, 2,3,5,6-tetramethyl-1,4-dimethoxybenzene, 2,5-di-tert-butyl-1,4-dimethoxybenzene, or a mixture of two or more thereof. However, where the electrode stabilizing additive contains lithium, and when used, it is not the same as the lithium salt.

The electrochemical cells described herein may also include in the electrolytes, an electrolyte stabilizing additive that may be $LiB(C_2O)$, $LiBF_2(C_2O_4)_2$, $LiPF_2(C_2O_4)_2$, $LiPF_4(C_2O_4)$, $LiPF_6$, $LiAsF_6$, CsF, $CsPF_6$, $LiN(SO_2F)_2$, $Li_2(B_{12}X_{12-i}H_i)$, $Li_2(B_{10}X_{10-i'}H_{i'})$, or a mixture of any two or more thereof. In such additives, each X is independently at each occurrence a halogen, i is an integer from 0 to 12 and i' is an integer from 0 to 10.

In another aspect, an electrochemical device is provided that includes a cathode, an anode, a porous separator; and any of the electrolytes described above, where a ratio of electrolyte mass to active cathode material mass does not exceed 4.

The cathodes may include a cathode active material comprising sulfur and/or selenium with a current collector and a binder. For example, the cathode active material may include an alkali sulfide, alkali selenide, alkali sulfide/selenide, alkaline earth metal sulfide, an alkaline earth metal selenide, an alkaline earth metal sulfide/selenide, elemental sulfur, elemental selenium, or a mixture of any two or more thereof. Illustrative examples of alkali metal sulfides include, but are not limited to, lithium sulfide. Illustrative examples of alkali metal selenides include, but are not limited to, lithium selenide. Illustrative examples of alkali metal sulfide/selenides include, but are not limited to, lithium sulfide/selenide. Illustrative examples of alkaline earth metal sulfides include, but are not limited to, magnesium sulfide. Illustrative examples of alkaline earth metal selenides include, but are not limited to, magnesium selenide. Illustrative examples of alkaline earth metal sulfide/selenides include, but are not limited to, magnesium sulfide/selenide.

The cathode current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy. Current collectors for the cathode may be made of a wire mesh.

The binder may be present in the anodes in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

In any of the above embodiments, the cathode may also include a conductive carbon material. Illustrative conductive carbon materials include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. In some embodiments, the conductive carbon materials include, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjen Black®. Layered structured materials of graphitic, carbonaceous, oxide or silicon, silicon-carbon composite, phosphorus-carbon composite, tin, tin alloys, silicon alloys, intermetallic compounds, lithium metal, sodium metal, or lithium titanium oxide. The anode may be stabilized by surface coating the active particles with a material. Hence the anodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, a mixture of any two or more thereof, or any other suitable metal oxide or fluoride. The anode may be further stabilized by surface coating the active particles with polymer materials. Examples of polymer coating materials include, but not limited to, polysiloxanes, polyethylene glycol, poly(3,4-ethylenedioxythiophene) polystyrene sulfonate, or a mixture of any two or more polymers.

The anodes may include an anode active material, a current collector, and a binder. Illustrative anode active materials include lithium, lithiated carbon, lithiated tin, lithiated silicon, sodium, sodiated carbon, sodiated tin, sodiated silicon, potassium, potassiated carbon, potassiated tin, potassiated silicon, magnesium, magnesiated carbon, magnesiated tin, magnesiated silicon, zinc, zincated carbon, zincated tin, zincated silicon, or a mixture of any two or more thereof. In other embodiments, the anode may include a lithium metal or a combination of lithium metal and sodium metal. The anode may be lithium metal or a lithium-containing material such as a lithium metal oxide, silicon, pre-lithiated graphite, or a lithium metal alloys. In some embodiments, the anode may be a lithium/sodium alloy, or a lithium/sodium metal oxide.

In addition to the anode active material, the anode may also include a current collector, a conductive carbon material, a binder, or any combination thereof.

The anode current collector may be prepared from a wide variety of materials. For example, illustrative current collectors include, but are not limited to, carbon, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the electroactive material disclosed herein and one or more of a conductive carbon material and a binder are contacted with the current collector by casting, pressing, or rolling the mixture thereto. In some embodiments, the current collector is copper, stainless steel, titanium, tantalum, platinum, gold, aluminum, nickel, cobalt, cobalt nickel alloy, highly alloyed ferritic stainless steel containing molybdenum and chromium, a nickel-containing alloy, a chromium-containing alloy, or a molybdenum-containing alloy.

The anode binder may be present in the anodes in an amount of from about 0.1 wt % to about 99 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

In any of the above embodiments, the anode may also include a conductive carbon material. Illustrative conductive carbon materials include, but are not limited to, synthetic graphite, natural graphite, expanded graphite, graphene, reduced graphene oxide, a metal-organic framework, amorphous carbon, hard carbon, soft carbon, carbon black, acetylene black, carbon spheres, mesocarbon microbeads (MCMB), mesoporous carbon, porous carbon matrix, carbon nanofiber, carbon aerogel, single-walled carbon nanotubes, multi-walled carbon nanotubes, carbon nanotube arrays, and any mixture of two or more thereof. In some embodiments, the conductive carbon materials include, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjen Black®. Layered structured materials of graphitic, carbonaceous, oxide or silicon, silicon-carbon composite, phosphorus-carbon composite, tin, tin alloys, silicon alloys, intermetallic compounds, lithium metal, sodium metal, or lithium titanium oxide. The anode may be stabilized by surface coating the active particles with a material. Hence the anodes can also comprise a surface coating of a metal oxide or fluoride such as $ZrO_2$, $TiO_2$, $ZnO_2$, $WO_3$, $Al_2O_3$, MgO, $SiO_2$, $SnO_2$, $AlPO_4$, $Al(OH)_3$, $AlF_3$, $ZnF_2$, $MgF_2$, $TiF_4$, $ZrF_4$, a mixture of any two or more thereof, or any other suitable metal oxide or fluoride. The anode may be further stabilized by surface coating the active particles with polymer materials. Examples of polymer coating materials include, but not limited to, polysiloxanes, polyethylene glycol, poly(3,4-ethylenedioxythiophene) polystyrene sulfonate, or a mixture of any two or more polymers.

The cell may also include a separator, which is various embodiments may include a porous separator. Illustrative porous separators include a glass fiber material, a carbon fiber material, polyethylene, polypropylene, coated separators, aramid separators, solid state membranes, or a combination of any two or more thereof or a coated version of thereof.

The present invention, thus generally described, will be understood more readily by reference to the following examples, which are provided by way of illustration and are not intended to be limiting of the present invention.

EXAMPLES

Example 1. Lithium sulfur cells (CR2032 coin cells) were assembled using lithium foil (99.9%, MTI Corporation) as an anode, a cathode, an electrolyte, and a polypropylene separator between the cathode and anode. The cathode was prepared by casting a slurry composition of active material, carbon black, polyvinylidene fluoride at a mass ratio of 6:2:2 dispersed in N-Methyl-2-pyrrolidone at a solid content of 25% and casted onto an aluminum foil using a doctor blade. The slurry was then dried at 60° C. in vacuum prior to incorporation of the cathode into the coin cell.

Various electrolytes were prepared in a mixed solvent of equal volumes of DOL and DME. The electrolytes contained $Li[N(SO_2CF_3)_2]$ (lithium bis(trifluoromethanesulfonyl)imide or "LiTFSI," 99.995%, Sigma-Aldrich) at concentrations of 0.05 to 1M, and lithium nitrate ($LiNO_3$, Sigma-Aldrich) at concentrations of 0.25 to 0.025 M. The LiTFSI and $LiNO_3$ were dried in a vacuum oven at 120° C. overnight prior to use to remove water. The cells were assembled in an argon-filled glove box ($O_2$<0.1 ppm, water <0.5 ppm).

Figure 3:
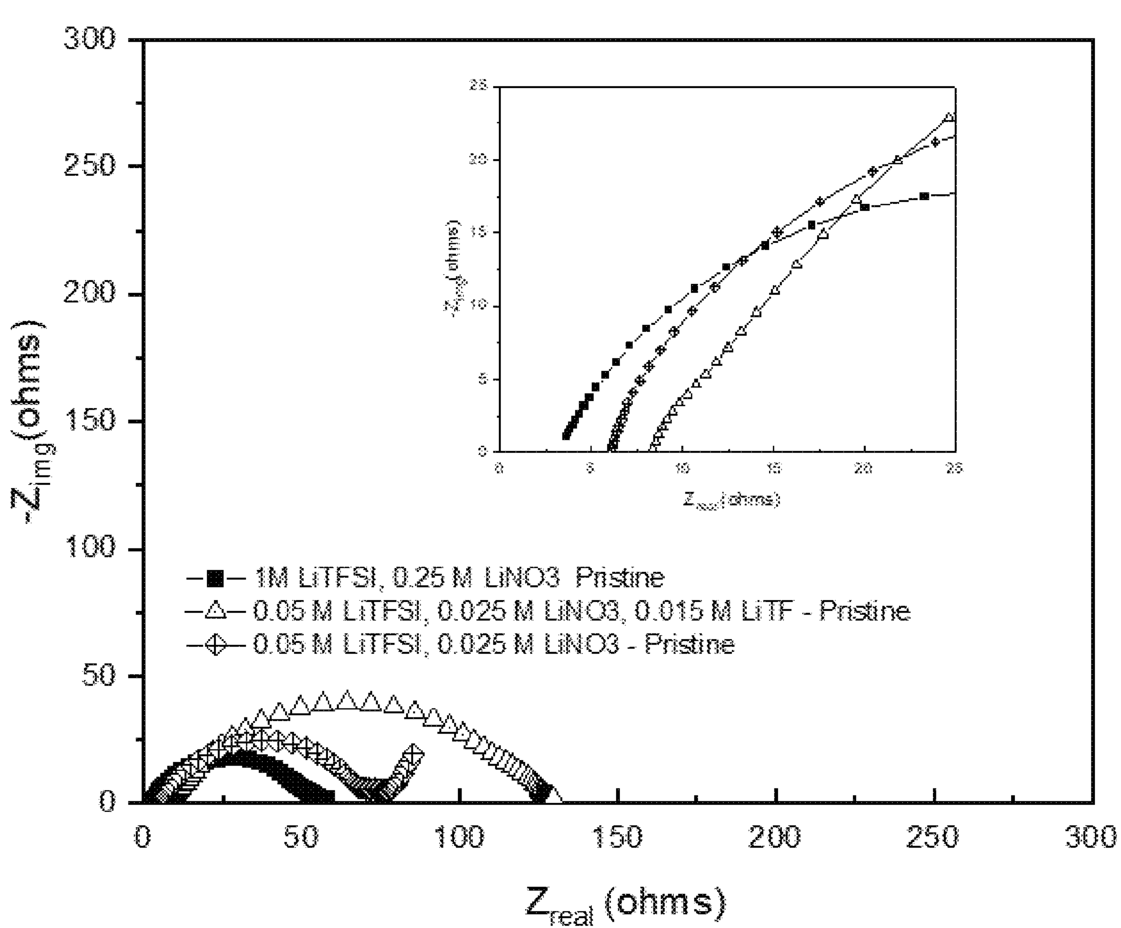
FIG. 3 is an impedance Cole-Cole plot of 4 mg $cm^{-2}$ sulfur cells with an electrolyte-to-sulfur ratio of 2.5 at its initial state after 6 hours of wetting for the following cells: 1M LiTFSI and 0.25 M $LiNO_3$ in DOL/DME (v/v=1/1); 0.05M LiTFSI, 0.025 M $LiNO_3$, and 0.015 M LiTF in DOL/DME (v/v=1/1); and 0.05M LiTFSI and 0.025 M $LiNO_3$ in DOL/DME (v/v=1/1), according to the examples.
Figure 4:
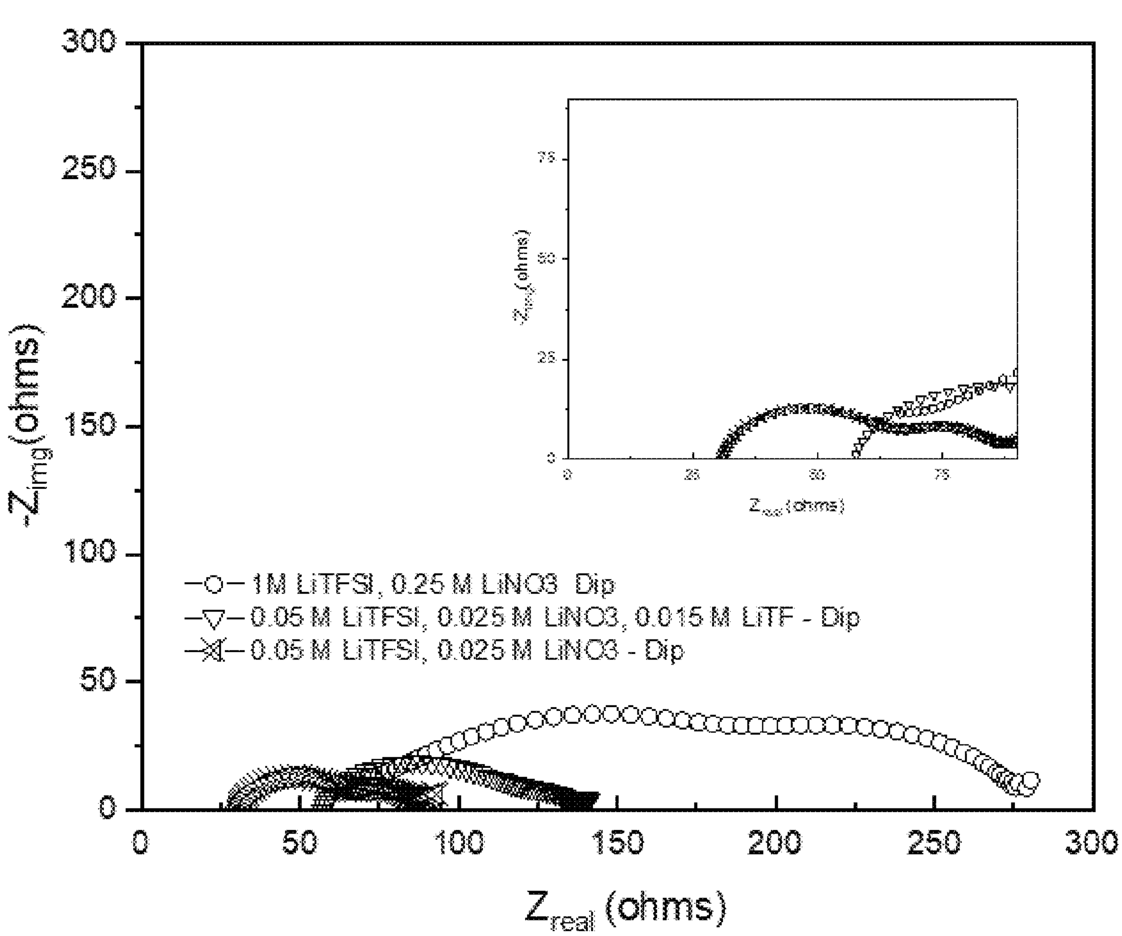
FIG. 4 is an impedance Cole-Cole plot of 4 mg $cm^{-2}$ sulfur cells with an electrolyte-to-sulfur ratio of 2.5 midway through the first discharge at the voltage dip, prior to the beginning of the second voltage plateau for cells prepared as in FIG. 3.
Figure 5:
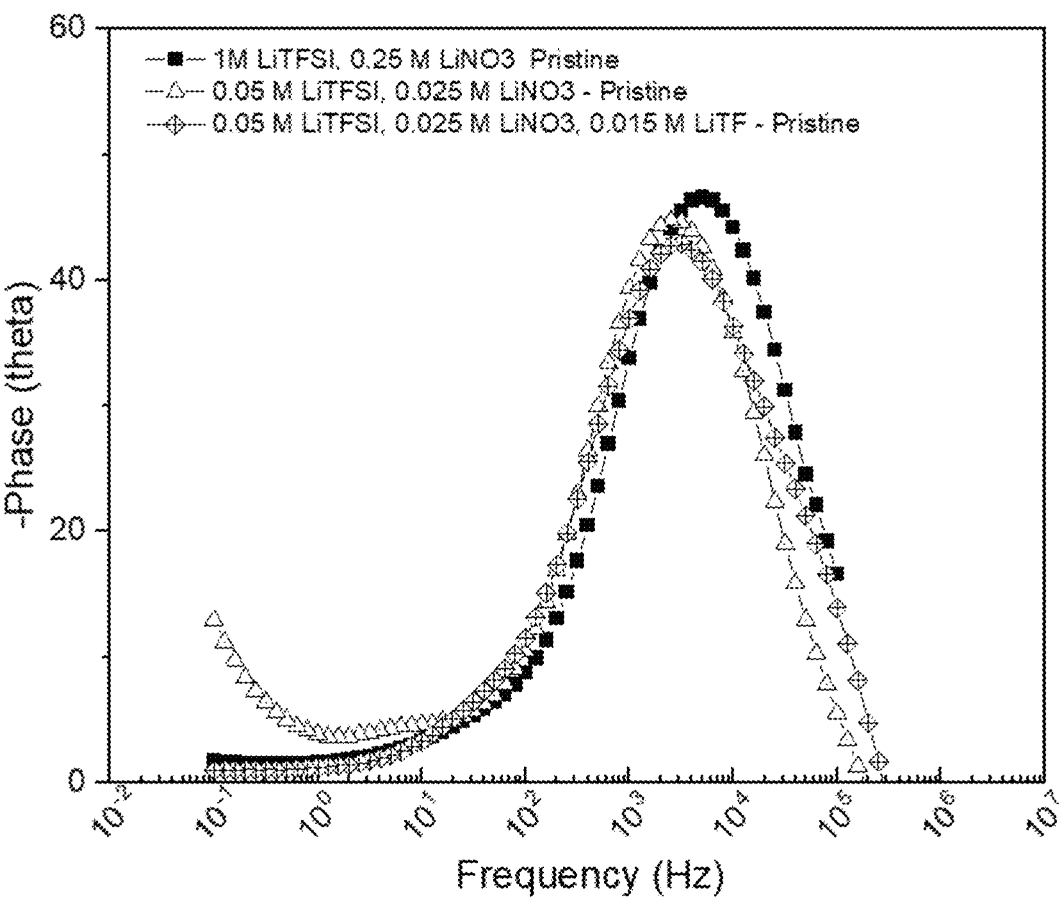
FIG. 5 is a phase Bode plot corresponding to FIG. 3.
Figure 6:
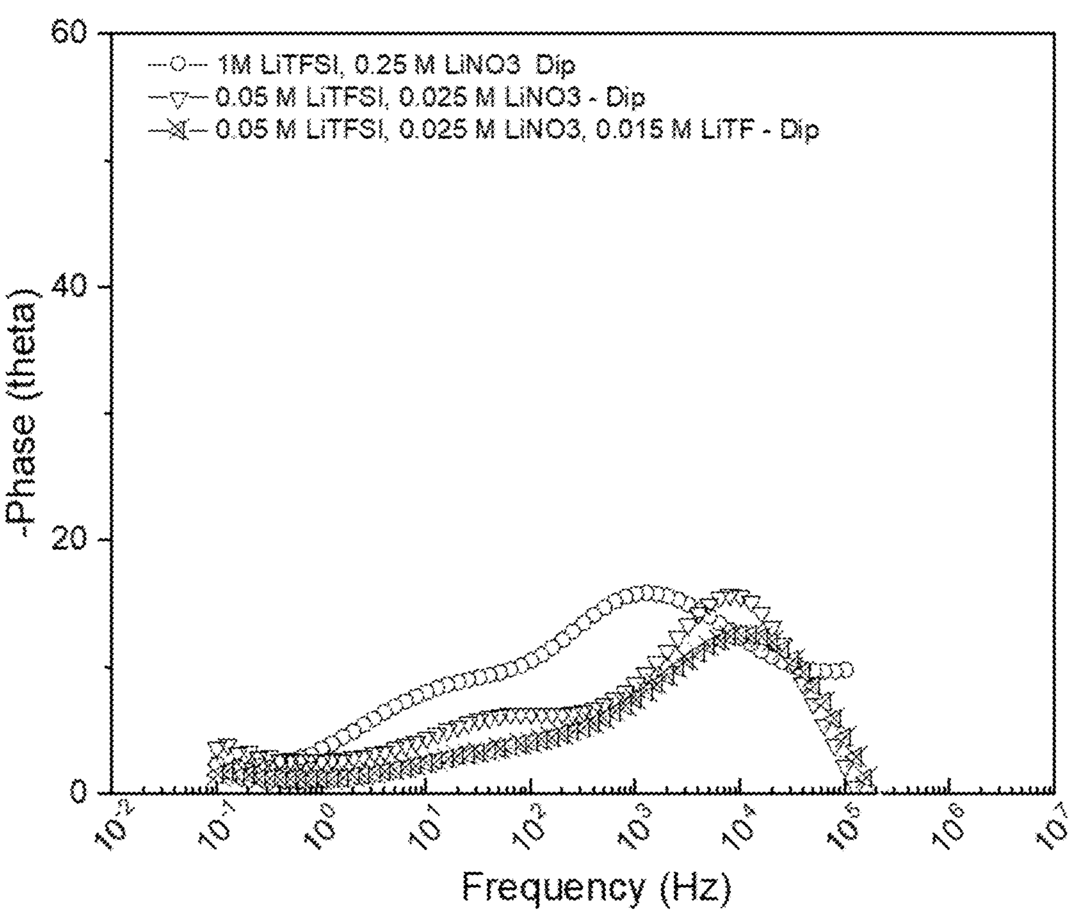
FIG. 6 is a phase Bode plot corresponding to FIG. 4.
Figure 7:
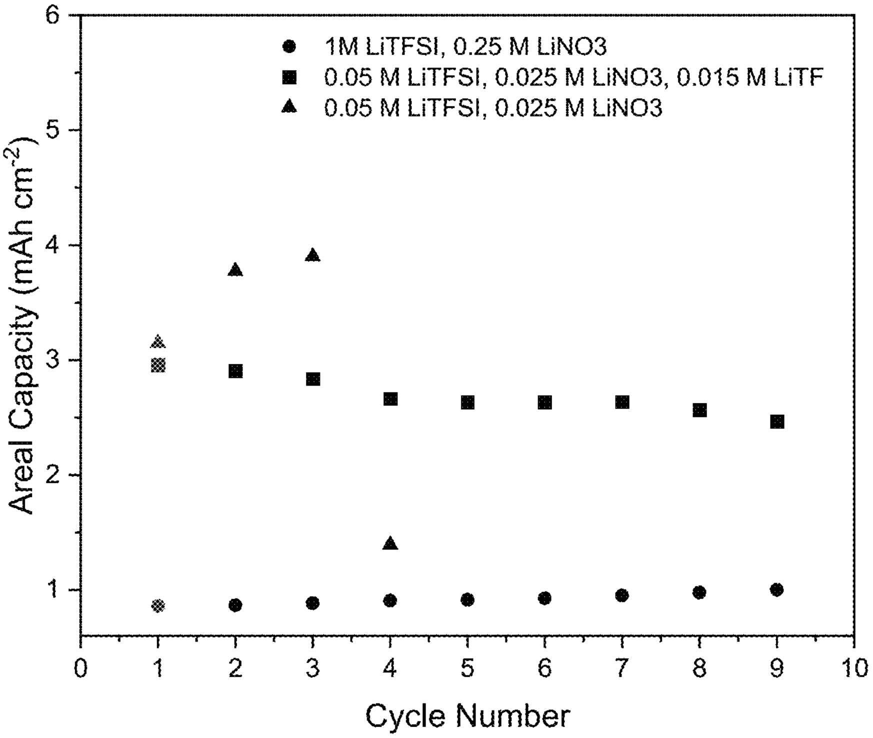
FIG. 7 is a graph of the cycle life at 0.05 C, 2.5 μL $mg^{-1}$ and 4 mg $cm^{-2}$ for the following electrolytes: 1M LiTFSI and 0.25 M $LiNO_3$ in DOL/DME (v/v=1/1); 0.05M LiTFSI, 0.025 M $LiNO_3$, and 0.015 M LiTF in DOL/DME (v/v=1/1); and 0.05M LiTFSI and 0.025 M $LiNO_3$ in DOL/DME (v/v=1/1), according to the examples

A voltage window of 1.75-2.8 V (vs. $Li^+$/Li) and a current of 0.05 C (1 C=1.675 mA $mg^{-1}$ of sulfur) was applied to the cells. The areal mass loading of S was 4 mg $cm^{-2}$, and the electrolyte content was maintained at 2.5 μL $mg_s^{-1}$. FIG. 1 contrasts the short discharge profile of such a battery using a relative high electrolyte composition of 1 M LiTFSI and 0.25 M $LiNO_3$ and a low-Li-ion concentration electrolyte using the same salts (0.05 M LiTFSI and 0.025M $LiNO_3$). Impedance analysis shows that the electrolyte composition of 0.05 M LiTFSI and 0.025 M $LiNO_3$ exhibits a higher impedance in the pristine state (FIG. 3 and FIG. 5) compared to the 1 M LiTFSI and 0.25 M $LiNO_3$ cells but a lower in the impedance taken at the voltage dip prior to the $2^{nd}$ discharge plateau (FIG. 4 and FIG. 6), across all electrochemical time constants.

Figure 2:
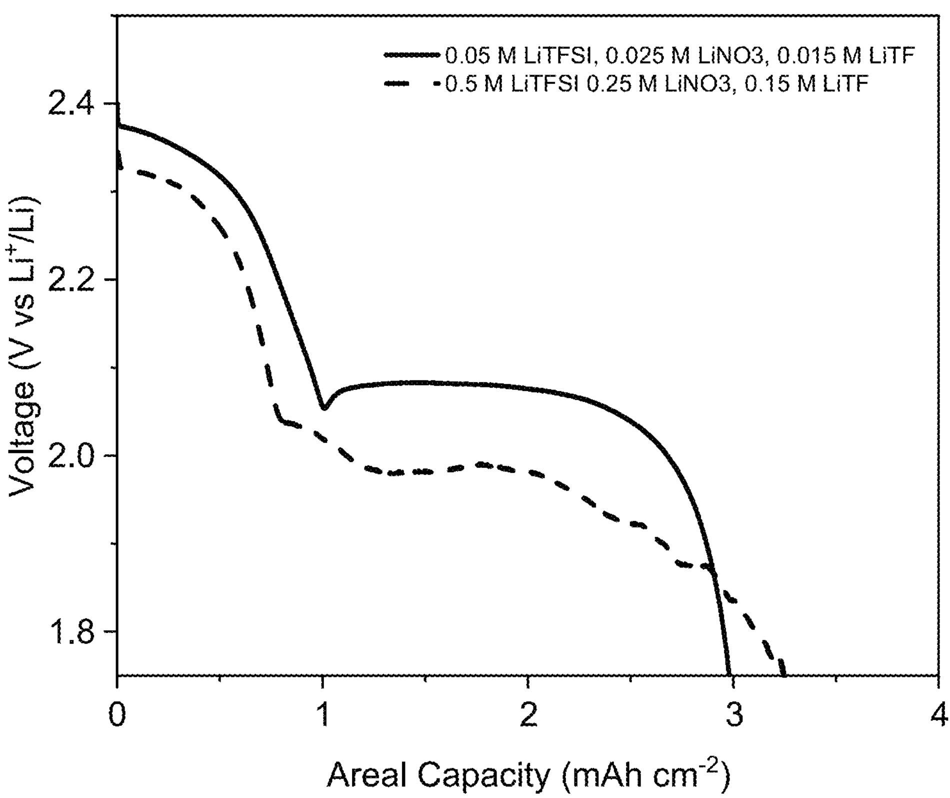
FIG. 2 is a graph of the first discharge voltage profile of a lithium sulfur battery having an areal sulfur loading of 4 mg $cm^{-2}$ and an electrolyte volume to sulfur mass ratio of 2.5 μL $mg^{-1}{}_{Sulfur}$ at 0.05 C of varying electrolyte compositions: 1) 0.5M LiTFSI, 0.15 M LiTF, and 0.25 M $LiNO_3$ in DOL/DME (v/v=1/1); and 2) 0.05 M LiTFSI, 0.015 M LiTF, and 0.025 M $LiNO_3$ in DOL/DME (v/v=1/1), according to the examples.

Example 2. Lithium-sulfur batteries were tested in a similar manner to Example 1 with the exception of differing electrolyte composition. One cell contained an electrolyte of 0.015 M $Li[SO_3CF_3]$, 0.05 LiTFSI, and 0.025 $LiNO_3$ (low concentration) and the other cell 0.15 M $Li[SO_3CF_3]$, 0.5 LiTFSI, and 0.25 $LiNO_3$ (high concentration). FIG. 2 shows the $1^{st}$ discharge voltage profile of the sulfur cathode with 4 mg $cm^{-2}$ and an electrolyte-to-sulfur ratio of 2.5 μL $mg_s^{-1}$. It can be seen that with the reduction in Li-ion concentration (i.e. the low concentration cell), the voltage profile becomes more positive and well-defined. Impedance analysis shows that the electrolyte composition of 0.05 M LiTFSI, 0.025 M $LiNO_3$, and 0.015 M $Li[SO_3CF_3]$ exhibited the highest impedance in the pristine state (FIGS. 3 and 5) but the lowest in the impedance taken at the voltage dip prior to the $2^{nd}$ discharge plateau (FIGS. 4 and 6) across all electrochemical processes.

Figure 8:
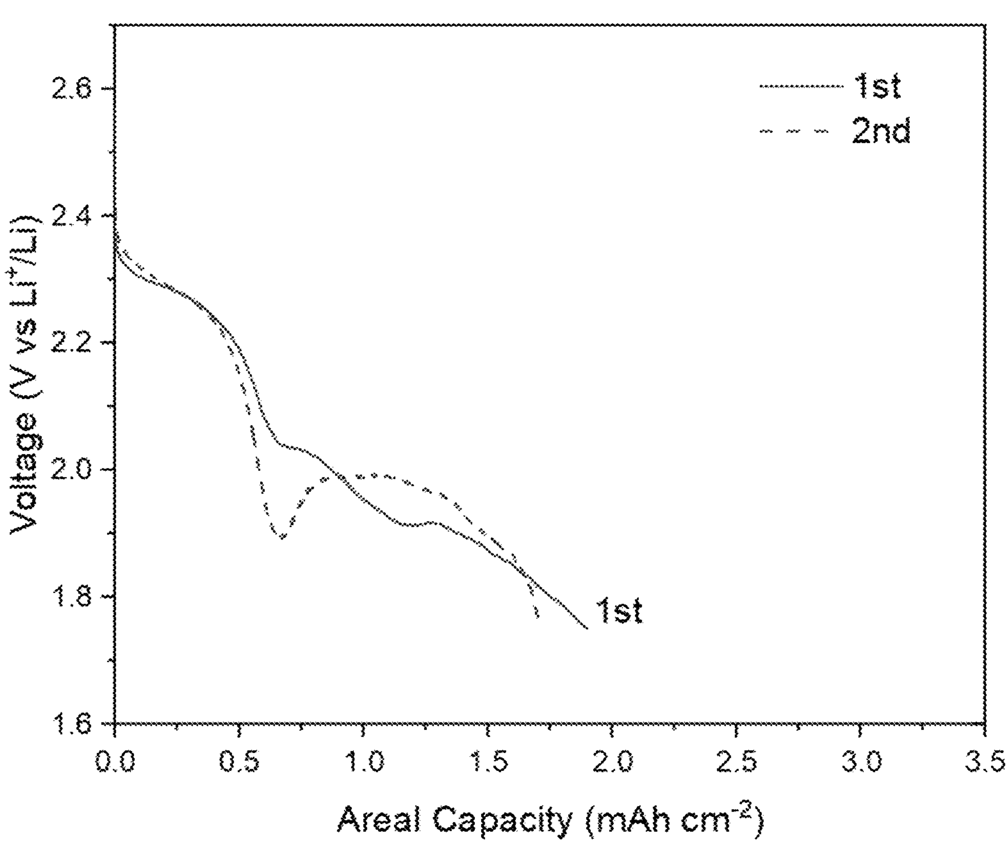
FIG. 8 is a graph showing the first and second discharge voltage profiles of a lithium 10% selenium-doped sulfur battery with an areal sulfur loading of 4 mg $cm^{-2}$ and electrolyte volume to sulfur mass ratio of 2.5 μL $mg^{-1}{}_{Sulfur}$ at 0.025 C using 1M LiTFSI and 0.25 M $LiNO_3$ in DOL/DME (v/v=1/1), according to the examples.
Figure 9:
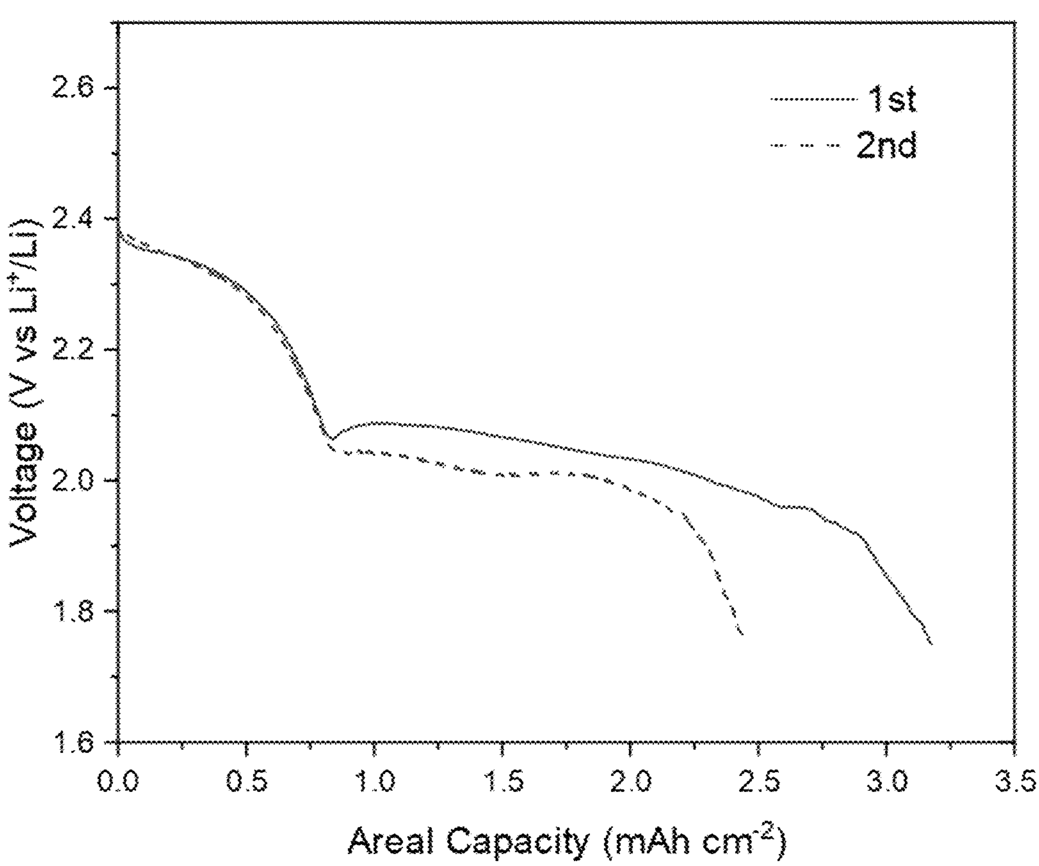
FIG. 9 is a graph showing the first and second discharge voltage profile of a lithium 10% selenium-doped sulfur battery with an areal sulfur loading of 4 mg $cm^{-2}$ and electrolyte volume to sulfur mass ratio of 2.5 μL $mg^{-1}{}_{Sulfur}$ at 0.025 C using 0.05 M LiTFSI, 0.015 M LiTF, and 0.025 M $LiNO_3$ in DOL/DME (v/v=1/1), according to the examples.
Figure 10:
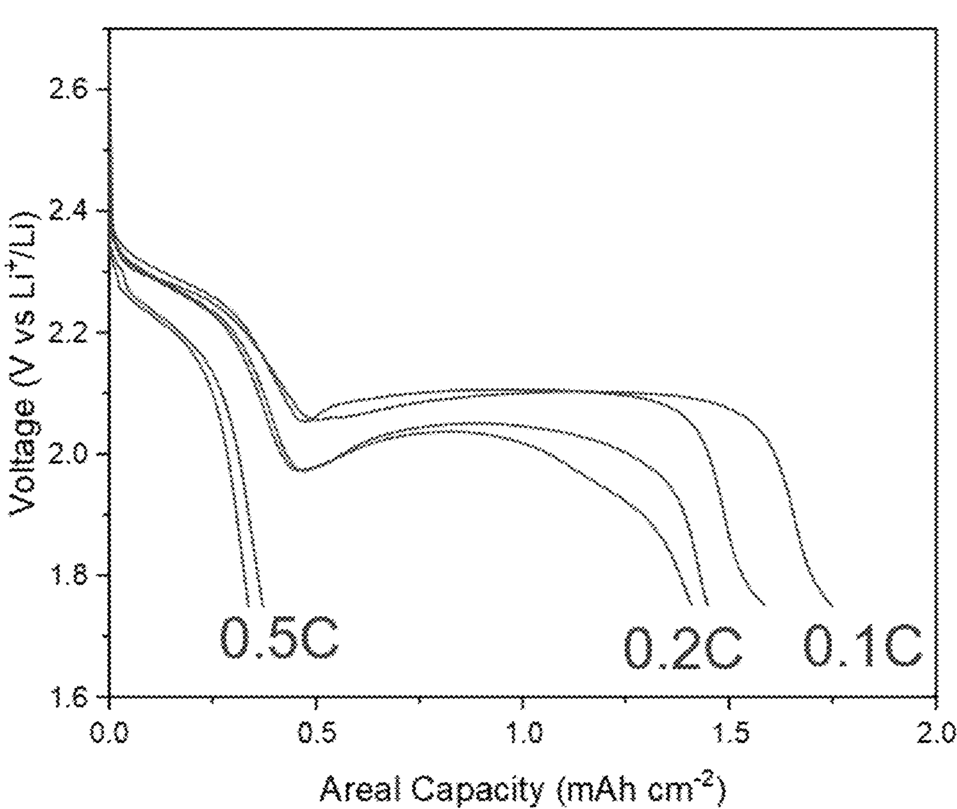
FIG. 10 is a graph showing the discharge voltage profiles lithium 10% selenium-doped sulfur batteries with an areal sulfur loading of about 1.75 mg $cm^{-2}$ and having an electrolyte volume to sulfur mass ratio of 4 μL $mg^{-1}{}_{Sulfur}$ using 1 M LiTFSI and 0.25 M $LiNO_3$ in DOL/DME (v/v=1/1) at varying current densities (0.1, 0.2 and 0.5 C, 1 C=1675 mA/g), where two cycles were taken at each current density, according to the examples.
Figure 11:
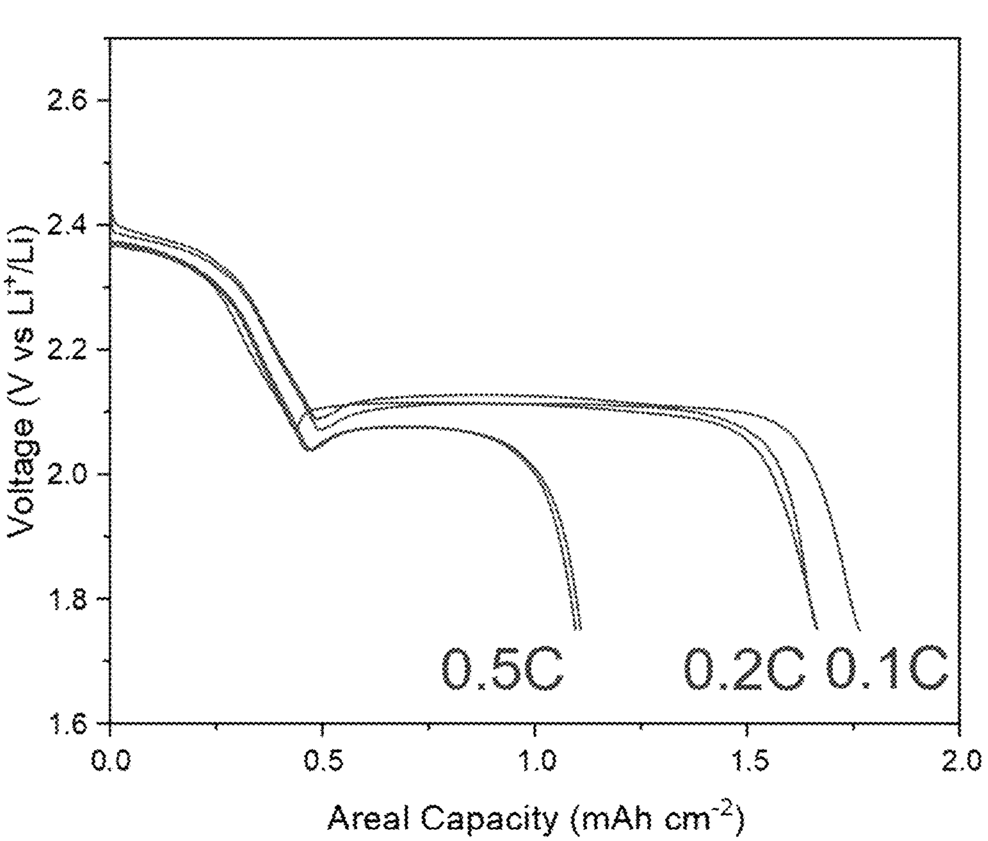
FIG. 11 is a graph showing the first and second discharge voltage profiles of a lithium 10% selenium-doped sulfur batteries with an areal sulfur loading of 4 mg $cm^{-2}$ and electrolyte volume to sulfur mass ratio of 2.5 μL $mg^{-1}{}_{Sulfur}$ using 0.05 M LiTFSI, 0.015 M LiTF, and 0.025 M $LiNO_3$ in DOL/DME (v/v=1/1) at varying current densities (0.1, 0.2 and 0.5 C, 1 C=1675 mA/g), where two cycles were taken at each current density, according to the examples.

Example 3. Lithium 10% selenium-doped sulfur batteries were tested in a similar manner to Examples 1 and 2. Selenium was doped into sulfur by heating 10% by weight of elemental selenium with 90% elemental sulfur at 155° C. FIGS. 8 and 9 contrast the performance at different electrolyte compositions. FIG. 8 was obtained with an electrolyte of 1 M LiTFSI and 0.25 M $LiNO_3$, while the electrolyte of FIG. 9 was 0.05 M LiTFSI, 0.025 M $LiNO_3$, and 0.015 M $Li[SO_3CF_3]$ in DOL/DME (1:1 by volume). The loading of active material was at 4 mg $cm^{-2}$, and an electrolyte-to-sulfur ratio of 2.5 μL $mg_s^1$ was used. Performance using the first electrolyte composition (FIG. 8) showed poorer performance than the low concentration electrolyte in FIG. 9. Cells were also tested at lower mass loadings (i.e. at about 1.7 $mg_{S+Se}$ $cm^{-2}$) and having a higher E/S ratio (i.e. about 4). FIG. 10 shows such a cell using 1 M LiTFSI and 0.25 M $LiNO_3$. As will be observed in FIG. 11, the low concentration electrolyte (0.05 M LiTFSI, 0.025 M $LiNO_3$, and 0.015 M $Li[SO_3CF_3]$ in 1:1 DOL/DME) provided enhanced performance in terms of the discharge capacity and discharge potential.

Figure 12:
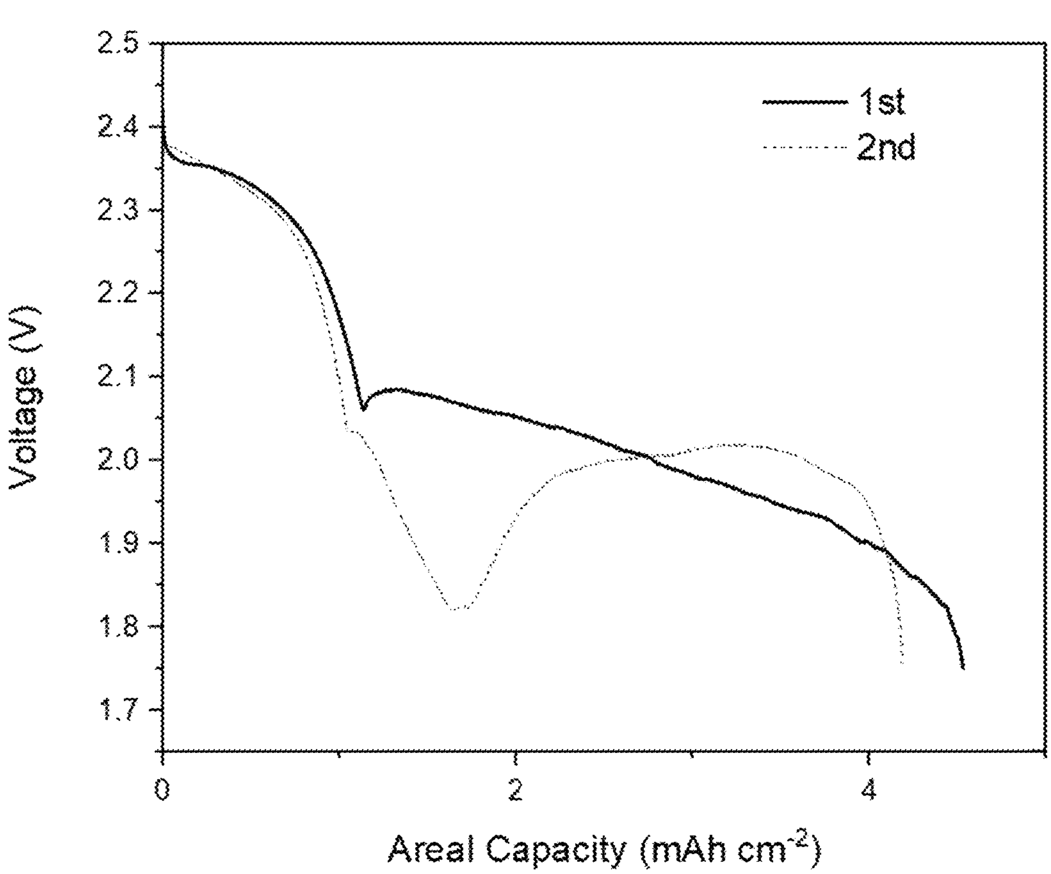
FIG. 12 is a graph showing the first and second discharge voltage profiles of a lithium 10% selenium-doped sulfur battery with an areal sulfur loading of 4 mg $cm^{-2}$ and electrolyte volume to sulfur mass ratio of 2.5 μL $mg^{-1}{}_{Sulfur}$ at 0.025° C. using 1 M LiTFSI and 0.25 M $LiNO_3$ in DOL/DME (v/v=1/1) diluted with 1% (by volume) 1,1,2,2-tetrafluoroethyl-2,2,3,3-tetrafluoropropyl ether, according to the examples.
Figure 13:
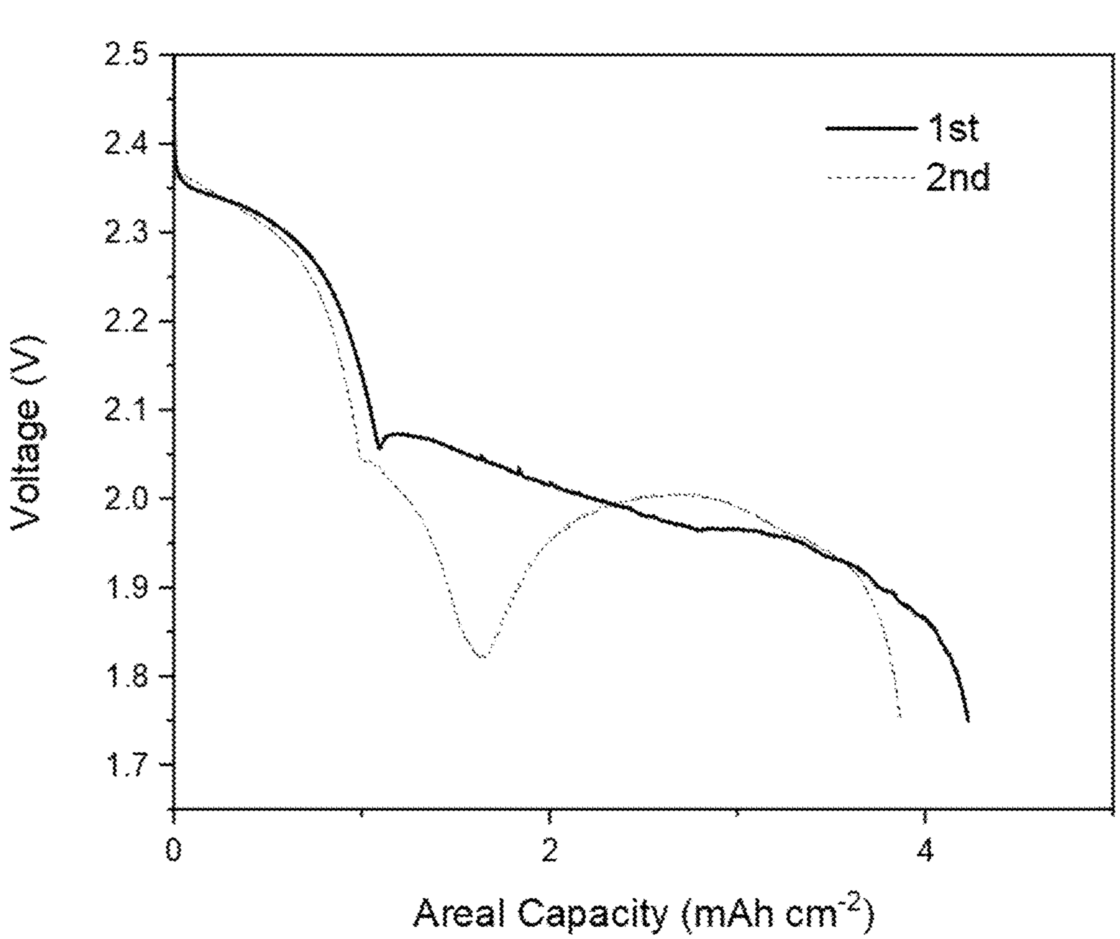
FIG. 13 is a graph showing the first and second discharge voltage profiles of a lithium 10% selenium-doped sulfur battery with an areal sulfur loading of 4 mg $cm^{-2}$ and electrolyte volume to sulfur mass ratio of 2.5 μL $mg^{-1}{}_{Sulfur}$ at 0.025 C using 1 M LiTFSI and 0.25 M $LiNO_3$ in DOL/DME (v/v=1/1) diluted with 5% (by volume) 1,1,2,2-tetrafluoroethyl-2,2,3,3-tetrafluoropropyl ether, according to the examples.
Figure 14:
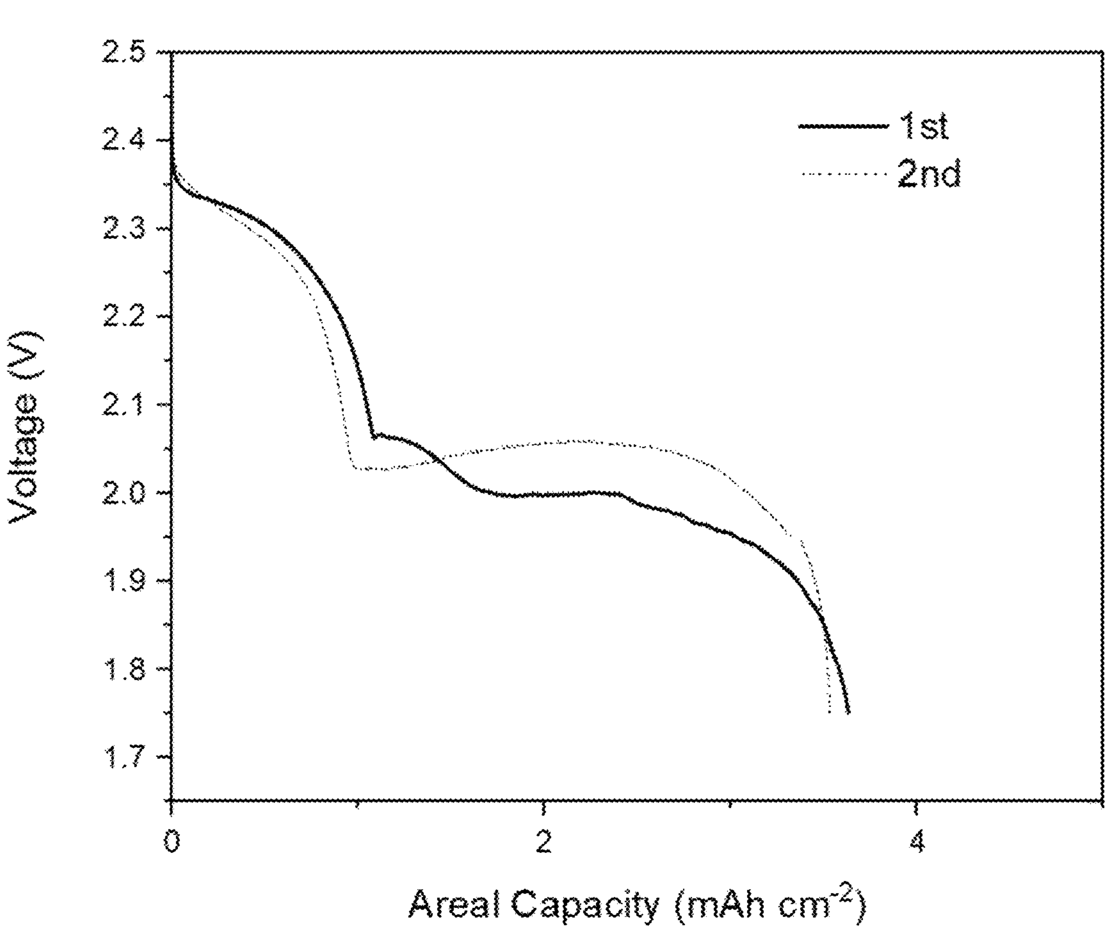
FIG. 14 is a graph showing the first and second discharge voltage profiles of a lithium 10% selenium-doped sulfur battery with an areal sulfur loading of 4 mg $cm^{-2}$ and electrolyte volume to sulfur mass ratio of 2.5 μL $mg^{-1}{}_{Sulfur}$ at 0.025° C. using 1 M LiTFSI and 0.25 M $LiNO_3$ in DOL/DME (v/v=1/1) diluted by 20% (by volume) 1,1,2,2-tetrafluoroethyl-2,2,3,3-tetrafluoropropyl ether, according to the examples.

Example 4. Lithium-sulfur batteries were tested in a similar manner to Examples 1-3. FIGS. 12, 13, and 14 contrast the performance at different electrolyte compositions with the addition of a fluorinated solvent (i.e. 1,1,2,2-tetrafluoroethyl-2,2,3,3-tetrafluoropropyl ether). The electrolytes included 0.05 M LiTFSI, 0.025 M $LiNO_3$, and 0.015 M $Li[SO_3CF_3]$ in 1:1 DOL/DME, and included 1 vol % (FIG. 12), 5 vol % (FIG. 13), and 20 vol % (FIG. 14) of the fluorinated solvent. The loading of active material in the cathode was 4 mg $cm^{-2}$, and an electrolyte-to-sulfur ratio of 2.5 μL $mg_s^{-1}$ was used. As will be observed, the addition of 20% of 1,1,2,2-tetrafluoroethyl-2,2,3,3-tetrafluoropropyl ether showed the best performance in terms of discharge capacity and voltage.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochemical device comprising:

a cathode comprising a cathode active material;

an anode;

a porous separator; and a non-aqueous electrolyte comprising:

$LiNO_3$;

a high donor number anion;

a highly dissociative lithium salt other than $LiNO_3$; and an aprotic solvent;

wherein:

a total lithium salt concentration from the high donor number anion and the highly dissociative lithium salt that is not originating from $LiNO_3$, is below 0.1 M;

the electrochemical device is a lithium sulfur, lithium selenium, or lithium sulfur-selenium battery; and a ratio of non-aqueous electrolyte mass to cathode active material mass does not exceed 4.

2. The electrochemical device of claim 1, wherein the high donor number anion comprises $Li[CF_3CO_2]$, $Li[CF_3SO_3]$, $LiClO_4$, LiI, LiBr, or a mixture of any two or more thereof.

3. The electrochemical device of claim 1, wherein a concentration of the high donor number anion is 0.02 M or less.

4. The electrochemical device of claim 1, wherein a concentration of the highly dissociative lithium salt is 0.06 M or less.

5. The electrochemical device of claim 1, wherein the highly dissociative lithium salt comprises a lithium alkyl fluorophosphate; a lithium alkyl fluoroborate; lithium 4,5-dicyano-2-(trifluoromethyl)imidazole; lithium 4,5-dicyano-2-methylimidazole; trilithium 2,2',2"-tris(trifluoromethyl) benzotris(imidazolate); $LiN(CN)_2$; $Li[CF_3CO_2]$; $Li[C_2F_5CO_2]$; $Li[CH_3SO_3]$; $Li[N(SO_2CF_3)_2]$; $Li[N(SO_2F)_2]$; $Li[C(CF_3SO_2)_3]$; $Li[N(SO_2C_2F_5)_2]$; $LiClO_4$; $LiBF_4$; $LiAsF_6$; $LiSbF_6$; $LiAlCl_4$; $LiPF_6$; $Li_2SO_4$; LiOH; $Li[BF_2(C_2O_4)]$; $Li[B(C_2O_4)_2]$; $Li[PF_2(C_2O_4)_2]$; $Li[PF_4(C_2O_4)]$; $Li_2(B_{12}X_{12-p}H_p)$; $Li_2(B_{10}X_{10-p'}H_{p'})$; or a mixture of any two or more thereof, wherein X is independently at each occurrence F, Cl, Br, or I, p is 0, 1, 2, 3, 4, 5, 6, 7, 8, 9, 10, 11, or 12, and p' is 0, 1, 2, 3, 4, 5, 6, 7, 8, 9, or 10.

6. The electrochemical device of claim 1, wherein the aprotic solvent comprises dimethoxyethane (DME), 1,3 dioxolane (DOL), diethylene glycol dimethyl ether (DEGDME), triethylene glycol dimethyl ether, tetraethylene glycol dimethyl ether (TEGDME), fluorinated ethers or fluorinated glycol or a mixture of any two or more thereof.

7. The electrochemical device of claim 1, wherein the aprotic solvent comprises a fluorinated ether or fluorinated polyether.

8. The electrochemical device of claim 7, wherein the aprotic solvent comprises the fluorinated ether and the fluorinated ether comprises a compound of formula $R^1OR^2$, wherein $R^1$ is fluorinated alkyl, and $R^2$ is alkyl, aryl, fluorinated alkyl, or fluorinated aryl.

9. The electrochemical device of claim 8, wherein $R^1$ and $R^2$ are individually $—(CH_2)_q(CR^4R^5)_pC(R^3)_3$, where each $R^3$, $R^4$, and $R^5$ is individually H or F, with the proviso that at least one of $R^3$, $R^4$, and $R^5$ is F, and where q is 0, 1, 2, or 3, and p is 0, 1, 2, 3, 4, 5, or 6.

10. The electrochemical device of claim 7, wherein the fluorinated polyether comprises a compound of formula $R^6(O(CH_2)_m)_x(O(CH_2)_n)_yOR^7$; wherein $R^6$ is fluorinated alkyl, $R^7$ is fluorinated alkyl, m and n are individually 0, 1, 2, 3, or 4, and x and y are 0 to 10, with the proviso that x and y are not both 0.

11. The electrochemical device of claim 10, wherein at least one of $R^6$ and $R^7$ is a difluorinated alkyl or trifluorinated alkyl.

12. The electrochemical device of claim 10, wherein $R^6$ and $R^7$ are individually a group of formula $—(CH_2)_q(CR^8R^9)_pC(R^{10})_3$, where each $R^8$, $R^9$, and $R^{10}$ is individually H or F, with the proviso that at least one of $R^8$, $R^9$, and $R^{10}$ is F, and where q is 0, 1, 2, or 3, and p is 0, 1, 2, 3, 4, 5, or 6.

13. The electrochemical device of claim 12, wherein $R^{10}$ is F, q is 1 or 2, and p is 0.

14. The electrochemical device of claim 12, wherein $R^8$, $R^9$, and $R^{10}$ is individually H or F; with the proviso that at least one of $R^8$, $R^9$, and $R^{10}$ is F; y is 0; x is 2, 3, 4, 5, or 6; m is 1, 2, or 3; q is 0, 1, 2, or 3; and p is 0, 1, 2, 3, 4, 5, or 6.

15. The electrochemical device of claim 12, wherein $R^{10}$ is F, y is 0, x is 2, 3, or 4, m is 1, 2, or 3, q is 1 or 2, and p is 0.

16. The electrochemical device of claim 12, wherein q is 1, p is 0, $R^{10}$ is F, y is 0, x is 2 or 3, and m is 2.

17. The electrochemical device of claim 1, wherein the cathode comprises an alkali earth metal sulfide, an alkali earth metal selenide, an alkali earth metal sulfide/selenide, elemental sulfur, elemental selenium, or a mixture of any two or more thereof.

18. The electrochemical device of claim 1, wherein the anode comprises lithium, lithiated carbon, lithiated tin, lithiated silicon, sodium, sodiated carbon, sodiated tin, sodiated silicon, potassium, potassiated carbon, potassiated tin, potassiated silicon, magnesium, magnesiated carbon, magnesiated tin, magnesiated silicon, zinc, zincated carbon, zincated tin, zincated silicon, or a mixture of any two or more thereof.

19. The electrochemical device of claim 1, wherein the anode further comprises a current collector, a conductive carbon material, a binder, or any combination thereof.

20. The electrochemical device of claim 1, wherein the non-aqueous electrolyte comprises about 0.01 to about 0.095 M of the high donor number anion, about 0.01 to 0.02 M of the highly dissociative lithium salt, about 0.01 to about 0.03

M $LiNO_3$, and solvent of 1,3-dioxolane mixed with an approximately equal volume of 1,2 dimethoxyethane.

21. The electrochemical device of claim 1, wherein the non-aqueous electrolyte comprises about 0.05 M of the high donor number anion, about 0.015 M of the highly dissociative lithium salt, about 0.025 M $LiNO_3$, and solvent of 1,3-dioxolane mixed with an approximately equal volume of 1,2 dimethoxyethane.

* * * * *